United States Patent [19]

Albenda

[11] 4,228,597
[45] * Oct. 21, 1980

[54] TEACHING DEVICE

[76] Inventor: Abraham R. Albenda, 45 Falmouth St., Brooklyn, N.Y. 11235

[ * ] Notice: The portion of the term of this patent subsequent to Feb. 14, 1995, has been disclaimed.

[21] Appl. No.: 931,508

[22] Filed: Aug. 7, 1978

[51] Int. Cl.³ .............................................. G09B 7/06
[52] U.S. Cl. ........................................ 35/9 B; 35/9 D
[58] Field of Search ................... 35/9 B, 9 C, 9 D, 48

[56] References Cited

U.S. PATENT DOCUMENTS

| | | | |
|---|---|---|---|
| 1,881,242 | 10/1932 | Prentice | 35/9 B |
| 3,070,904 | 1/1963 | Saba | 35/9 C |
| 3,106,027 | 10/1963 | Thelen | 35/9 C |
| 3,562,927 | 2/1971 | Moskowitz | 35/9 C X |
| 3,757,322 | 9/1973 | Barkan et al. | 35/9 B X |
| 3,763,574 | 10/1973 | Rose | 35/9 D |
| 3,771,240 | 11/1973 | Matui | 35/9 C |
| 3,795,989 | 3/1974 | Greenberg et al. | 35/9 B |
| 4,073,068 | 2/1978 | Albenda | 35/9 B |
| 4,115,931 | 9/1978 | Futhey | 35/9 B X |

Primary Examiner—Robert W. Michell
Assistant Examiner—Jeffrey W. Tayon
Attorney, Agent, or Firm—Frishauf, Holtz, Goodman & Woodward

[57] ABSTRACT

A base member has an electrically conductive layer thereon. An electrical power source and indicator device, such as a lamp, buzzer, etc. are electrically connected to the conductive layer. A metallic clip is provided on the base member, also electrically connected to the power source, and spaced from the conductive layer. A question and answer member is mounted on the base member with the clip in electrical connection with a second conductive layer which is part of the question and answer member. The question and answer member has a control opening in registration with a correct answer indicia whereby finger pressure on the correct answer indicia causes an electrical connection to be made between the second conductive layer of the question and answer member and the conductive layer on the base member to complete the electrical circuit to the indicator device. The question and answer member may be an integral or laminated layered structure.

23 Claims, 13 Drawing Figures

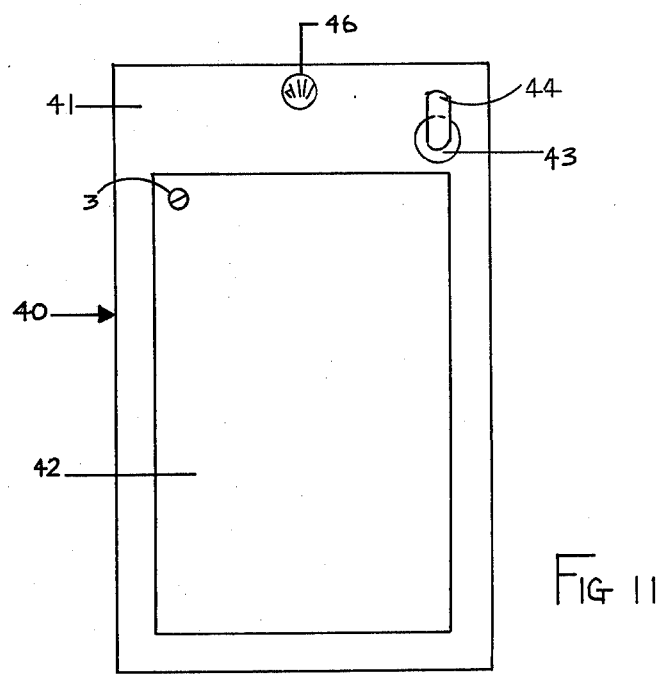
FIG-11
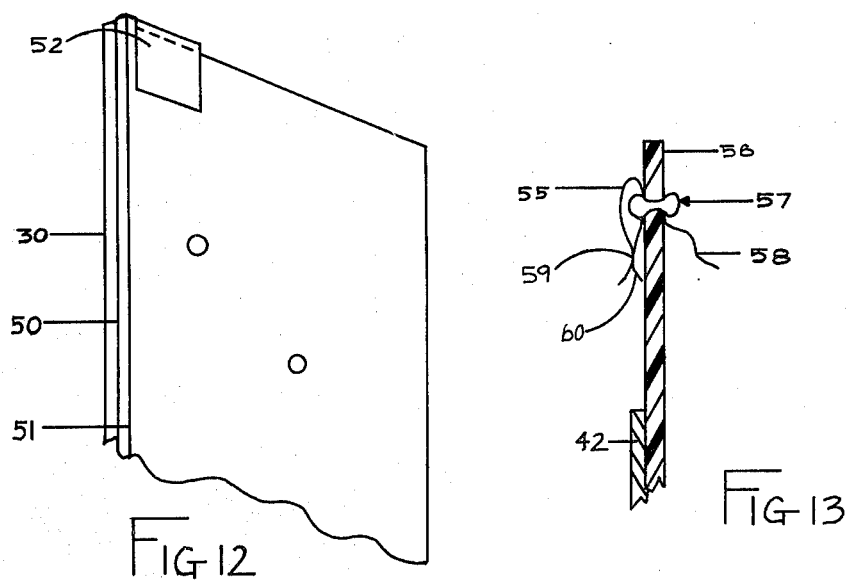
FIG-12
FIG-13

TEACHING DEVICE

CROSS REFERENCE TO RELATED PATENT

U.S. Pat. No. 4,073,068, issued Feb. 14, 1978 to Abraham R. Albenda.

BACKGROUND OF THE INVENTION

The present invention relates to teaching devices, and more particularly to a teaching device having questions and answers indicated thereon and which gives immediate response to correct answers by illumination of a light, the sounding of a buzzer and/or other indicating device.

The object of the present invention is to provide a simple teaching device utilizing electrical light and/or other immediate indication of correct answers and which has a simple structure and simple circuitry.

It is a further object of the invention to provide such a teaching device usable with a plurality of question and answer elements which are easily exchanged in the device.

It is still a further object of the invention to provide improved question and answer sheets which are easy to use and which are capable of easy and economical manufacture.

SUMMARY OF THE INVENTION

According to the present invention, an electrical teaching apparatus comprises a substantially rigid base member preferably made of electrically insulating material; a first electrically conductive layer at least partially covering a face of the base member; an electrically conductive contact member on the base member and electrically insulated from the first conductive layer; and a source of power coupled between the contact member and the first conductive layer. The apparatus further comprises a question and answer member adapted to overlie the first conductive layer and to electrically engage the contact member, the question and answer member including an electrically insulating bottom control layer which has at least one aperture or opening therein, a second electrically conductive layer on the upper surface of the control layer, and/or lower surface of the front question layer and overlying the at least one aperture or opening, an upper question layer overlying the second conductive layer and having at least one question imprinted thereon and indicia for selecting an answer, the control layer and question layer being coupled together in registration with each other, the question layer covering all but a portion of the second electrically conducting layer to expose the second conductive layer such that the contact member may electrically contact the second conductive layer. Further provided is an indicating light, buzzer or other indicating means coupled in series circuit with the power source, the electrically conductive layers, and the contact member. When pressure is applied to the area of a correct answer indicia, the electrical circuit is completed from the power source, through the contact member and the electrically conductive layers which contact each other via the at least one aperture in the control layer when the pressure is applied.

BRIEF DESCRIPTION OF THE DRAWINGS

FIG. 11 illustrates a base member of the teaching device for use with the question and answer member of FIG. 10;

FIG. 12 illustrates a further modified question and answer member; and

FIG. 13 illustrates a modified clip arrangement.

DETAILED DESCRIPTION

Figure 1:
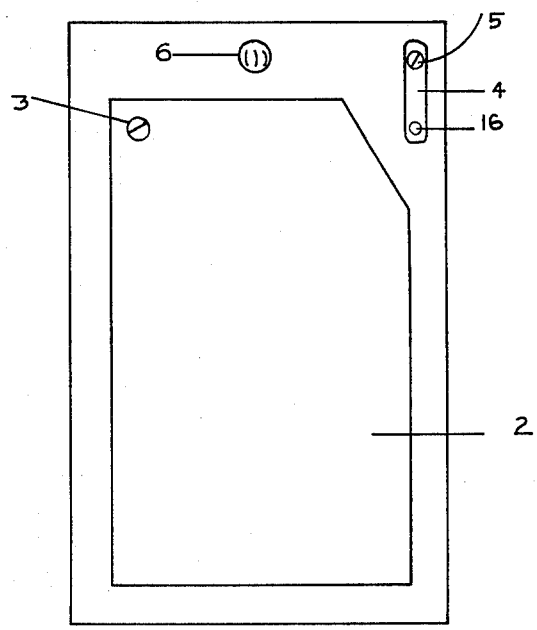
FIG. 1 is a front view of the teaching device of the present invention showing the indicator lamp assembly and the case member of the device.

FIG. 1 illustrates a base member 1 of rigid insulating material having a conducting layer 2 mounted thereon. The conducting layer 2 may be a metallic sheet or may be a layer of conducting material on base member 1. Layer 2 may be deposited on base layer 1. Base layer 1 may be electrically conductive, thereby serving the function of layer 2, as discussed below with reference to FIG. 8. An electrically conductive bolt, rivet, or the like, 3 passes through the metallic conductive layer 2 and through the base member 1 to the rear side thereof for making an electrical connection as will be described below with respect to FIG. 2. The base member 1 further has a metallic contact member 4 mounted thereto by means of an electrically conductive screw 5, rivet, or the like, which passes through to the rear of the base member 1 for making an electrically connection as will be described below with respect to FIG. 2. The contact member 4 is preferably of a spring-type metallic material and is spaced from the conducting layer 2. The contact member 4 preferably has a turned up end 16 to facilitate sliding a question and answer member (to be described hereinbelow) thereunder. An indicator lamp 6 is mounted in the base member. A buzzer or other indicating device may either replace lamp 6 or may be used in addition to lamp 6 to provide correct answer indication. A buzzer or other sound indicator is particularly useful when the device is used by visually handicapped people.

Figure 2:
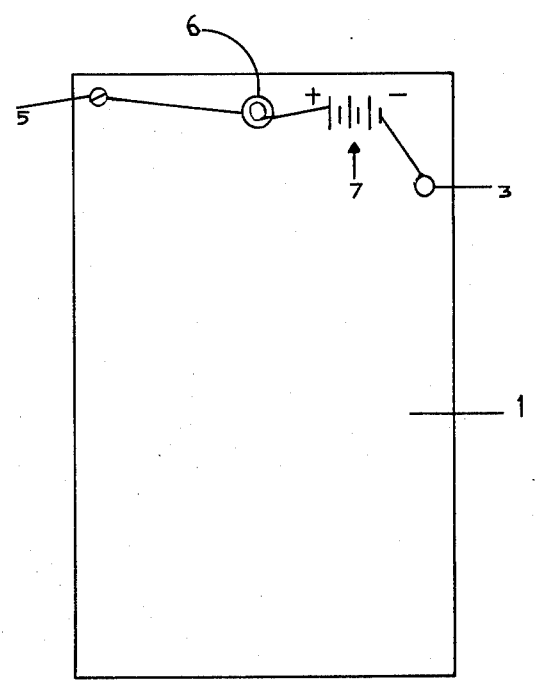
FIG. 2 is a rear view of the parts shown in FIG. 1, further showing the circuitry connecting a power source to the lamp assembly, to the contact member and to the metallic layer on the base member.

Referring to FIG. 2, the indicator lamp 6 is connected to a power source 7 by means of a wire, metallic tape, printed conductor, or the like. The indicator lamp 6 is further coupled to the bolt 5 which is electrically connected to the contact member 4. The power source 7 is further coupled to the bolt 3 which is electrically connected to the metallic sheet 2. Thus, a series circuit is formed between the metallic sheet 2, bolt 3, power source 7, indicator lamp 6, bolt 5 and contact member 4.

Figure 3:
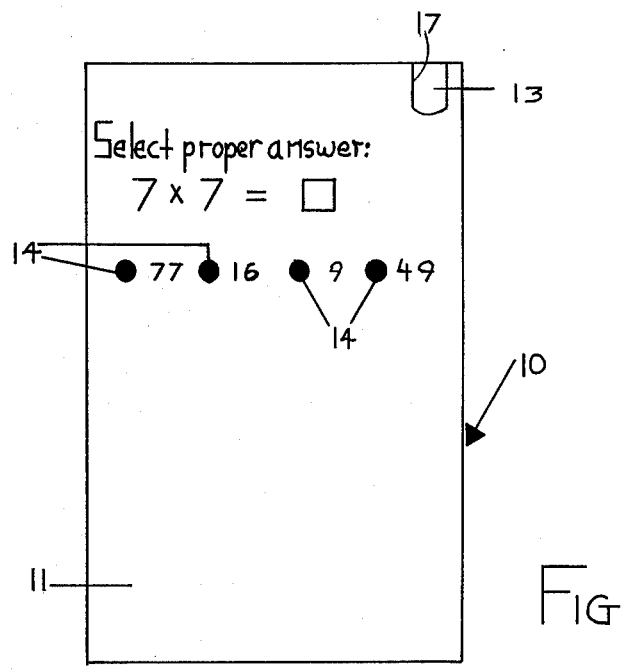
FIG. 3 is a front view of a question and answer member showing a sample objective question.
Figure 4:
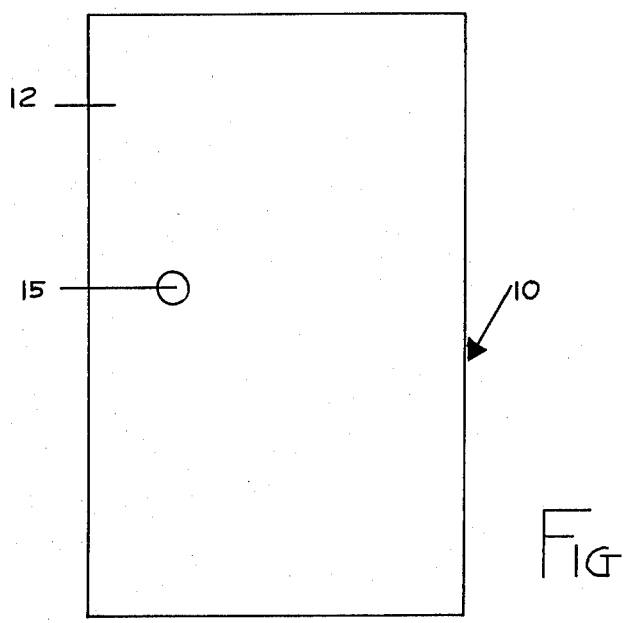
FIG. 4 is a rear view of the question and answer member of FIG. 3 showing an aperture below and in registration with the correct answer indicia.
Figure 5:
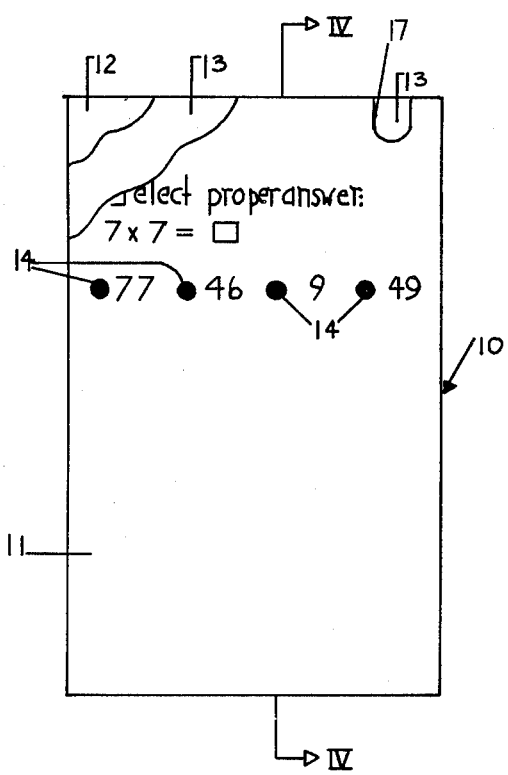
FIG. 5 is a front view of the question and answer member of FIGS. 3 and 4, partly broken away, showing a laminated or layered construction.

FIGS. 3 and 4 are front and rear view, respectively, of a question and answer member of the present invention, which differs from those of my earlier U.S. Pat. No. 4,073,068. FIG. 5 is a front view of the question and answer member, partly broken away to show its laminated or layered construction. The front question and answer layer 11 of the member 10 has at least one question imprinted thereon and a plurality of possible answers and answer indicia 14 thereon. In the illustrated embodiment, the answer indicia are circles imprinted on the front layer 11. Front layer 11 is of insulating material. The question and answer member 10 further includes a rear insulating control layer 12 with an aperture or opening 15 (see FIG. 4) therein. The aperture 15 is arranged so that the aperture 15 is in registration with the correct answer indicia 14 for the question imprinted on the front layer 11. The front layer 11 and control layer are preferably heavy paper-like material, cardboard or plastic sheets. A plurality of questions and respective answers can be imprinted on the front layer, with appropriate control apertures 15 in the rear layer 12. The insulating front layer 11 has a cutout portion, void, or opening 17 therein to expose the conductive layer 13 so that the conducting layer 13 can be electrically contacted by the contact member 4 when the device is assembled for use.

Figure 6:
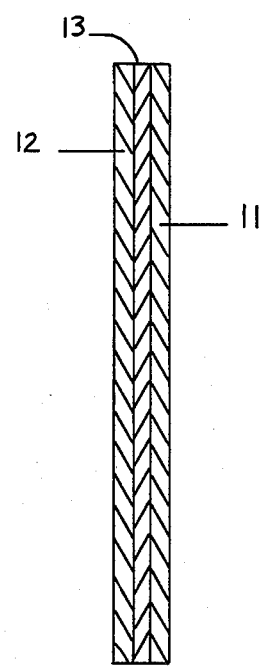
FIG. 6 is an enlarged cross-sectional view of the question and answer member of FIGS. 3–5.
Figure 9:
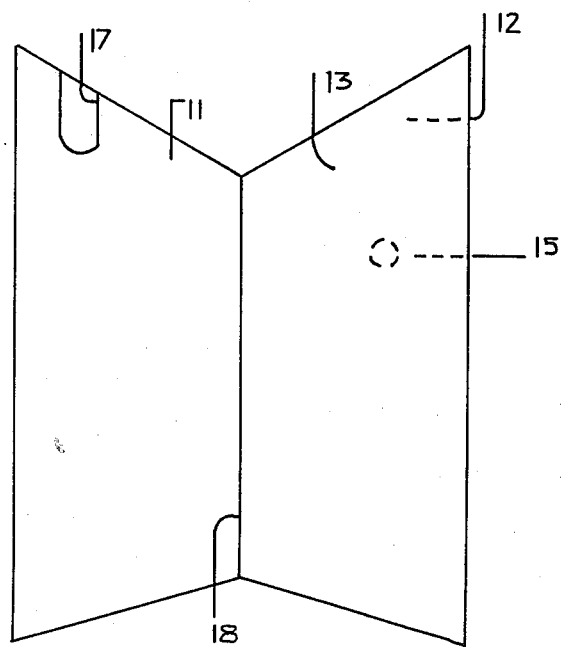
FIG. 9 illustrates a modified question and answer member.

As shown in FIGS. 5 and 6, an electrically conducting layer 13, such as a metallic foil, sheet of metal; or a deposited metal layer (i.e. metallic ink) is on control layer 12 so as to be interposed between the front layer 11 and the control layer 12. The front layer 11, control layer 12 and conducting layer 13 may be fabricated as a laminated structure or may be otherwise adhered permanently together. Alternatively the conducting layer may be laminated, adhered, coated, etc. on one of the front or control layers 11, 12. FIG. 9 illustrates such an alternative construction where the conducting layer is laminated, adhered, coated, printed with metallic ink, or the like on the control layer 12, the front layer 11 being connected to the control layer along fold line 18. The front and control layers are folded on line 18 to form a question and answer member similar in appearance to that of FIG. 5. The layers may be adhered or otherwise fixed together. The conducting layer 13 may be alternatively on the lower surface of the question layer 11.

Figure 7:
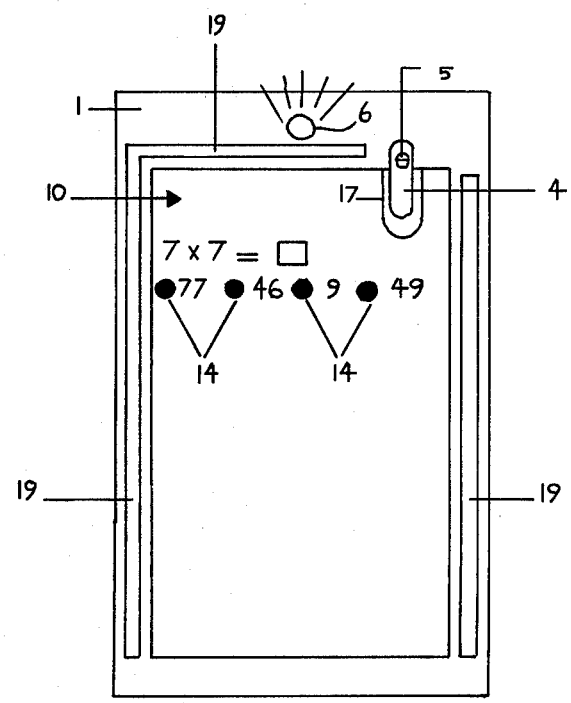
FIG. 7 is a front view of the teaching device of the present invention with the question and answer member of FIGS. 3–6 in its working position with the metal clip of the base member in contact with the electrically conductive layer of the question and answer member.

FIG. 7 shows the question and answer member 10 mounted on a base member 1. The question and answer member 10 is contacted or engaged with the springy contact member 4 so that the contact member 4 is in registration with opening 17 and makes electrical contact with conducting layer 13. Upon manually depressing the correct answer indicia 14 for the question imprinted on the question and answer layer 10, the electrical circuit to the indicator light 6 is completed by means of pressing the conducting layer 13 through the control aperture 15 to contact the metallic layer 2 on the base member 1. This causes the indicator light 6 to be illuminated, as indicated in FIG. 7.

Raised guides 19 may be provided on the base member, as shown in FIG. 7, to guide the question and answer member during mounting thereof on the base member.

Figure 8:
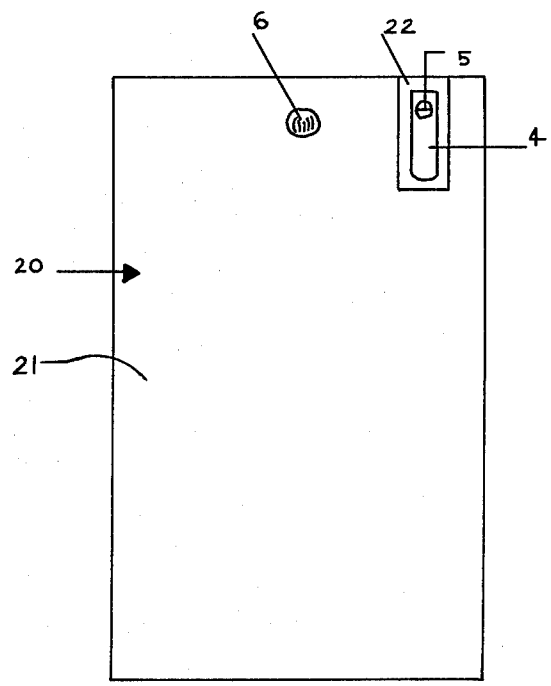
FIG. 8 is a front view of a modified base member of the present invention.

FIG. 8 shows a modified arrangement where the base member 20 has a conducting upper surface 21. The base member may be of conducting material or surface 21 may be laminated, coated, or otherwise secured thereto. An insulating layer 22 is on the base member in the vicinity of contact member 4 to insulate contact member 4 from conducting surface 21. Bolt or rivet 5 must also be insulated from conducting surface 21. The other electrical connections are as shown in FIG. 2. The connection between bulb 6 and surface 21 can be direct in the FIG. 8 embodiment.

Figure 10:
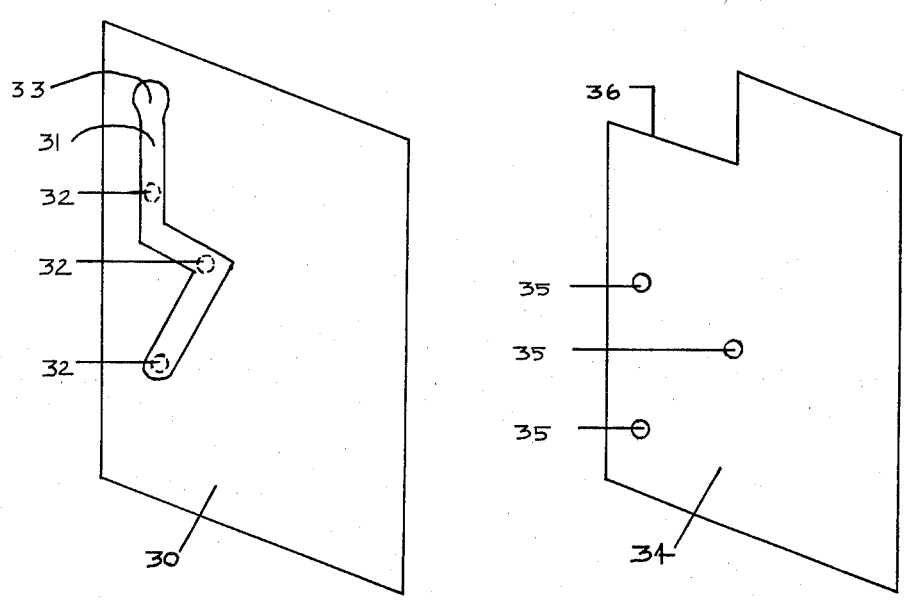
FIG. 10 illustrates a further modified question and answer member.

FIG. 10 illustrates a modified embodiment of a question and answer member according to the present invention which is suitable for use with the base member shown in FIG. 11. As shown in FIG. 10, the question and answer member comprises a front insulating layer 30 having a conductive layer 31 on the inner surface thereof. Conducting layer 31 may be a metallic foil, printed conductor, conducting ink, or the like. Metallic layer 31 may be in the nature of elongated or other shaped conductors interconnecting correct answer indicia 32 with a common electrical connection portion 33, or may be a solid layer, for example as shown in FIGS. 5 and 6. The rear control layer 34 has holes or apertures 35 which are to be in registration with the correct answer indicia 32 when layer 34 is placed on the rear surface of front layer 30. Control layer 34 has a notch or cut-out portion 36 which exposes the connecting area 33 when the layers are superposed on each other. The layers 30 and 34 may be laminated on each other, or may form a folder-type arrangement as illustrated in FIG. 9.

Referring to FIG. 11, a base member 40 for use with the question and answer member of FIG. 10 comprises an insulating upper surface 41 having a conducting layer 42 thereon. A further conducting area 43 is on the upper surface of the base member and is insulated from conducting layer 42. A pressure clip 44, which may be metallic or plastic, for example, is mounted on base member 40 to press a question and answer layer which is interposed between the upper surface of base member 40 and clip 44 against the conducting area 43. A light member 46 is provided for indicating correct answers.

The electrical interconnection is made in a manner similar to that shown in FIG. 2, except that the conducting area 43 is connected to the light bulb in place of the screw or rivet 5 shown in FIG. 2. The electrical connection may be accomplished by means of a screw or rivet, similar to screw or rivet 5 of FIG. 2, which passes through and contacts with electrically conducting area 43. If the clip 44 is metallic, it must be insulated from the other electrically conducting components of the device, except for the electrically conducting area 43 and the other conductors directly connected thereto. In operation, when a question and answer member of FIG. 10 is mounted on the base member of FIG. 11, the clip 44 engages over the front surface of the question sheet 30 and presses the conducting area 33 against the conducting area 43 through the opening or cut-out portion 36 of the control layer 34. The provision of the springy clip 44 is to insure good contact between the conducting areas 33 and 43.

FIG. 12 illustrates a portion of a modified question and answer member comprising an upper question layer 30 with a conducting layer 50 interposed between question layer 30 and control layer 51. The conducting layer 50 may be of the type shown in FIG. 10 or may be a layer which covers substantially the complete surface of the answer layer and/or control layer. The conducting layer 50 has an electrically conductive contact portion 52 which extends out from the upper portion of the question and answer member and is folded backward over the bottom surface of control layer 51. Thus, contact portion 52 is electrically connected with the conducting layer 50. The question and answer member of FIG. 12 is useful with the base member of FIG. 11 in a manner similar to the question and answer member of FIG. 10. The clip 44 presses the conducting contact portion 52 in close electrical contact with conducting area 43.

FIG. 13 illustrates a modified clip arrangement which is useful for all of the question and answer members illustrated in the drawings. The clip 55 of FIG. 13 is secured to the upper insulating surface 56 of a base member, such as base member 40 of FIG. 11, by means of a screw or rivet 57. The clip 55 is preferably metallic and electrical connection to the circuitry is made via, for example, a lead wire 58 conductive tape or other suitable conductor connected to the screw or rivet 57. The clip 55 is preferably of spring-type metal and has a width substantially the same as that of clip 44 of FIG. 11. The insulating front surface 56 of the base member has an electrically conducting layer 42 thereon, such as shown in FIG. 11. In use, the question and answer member is inserted between the two legs 59, 60 of the clip which springingly engages question and answer layer 30 and electrically contacts at least a portion of the conducting layer interposed anywhere between the question layer and control layer. When used with the question and answer member of FIG. 3, electrical contact is made with layer 13 through the opening 17. When used with the embodiment of FIG. 10, electrical contact is made with electrically conducting layer 33 through the opening 36. When used with the embodiment of FIG. 12, electrical contact is made directly with conducting portion 52. The double-clip arrangement of FIG. 13 is also useful with the question and answer members of my prior U.S. Pat. No. 4,073,068, as should be apparent.

As should be clear, various question and answer members may be easily interchanged and mounted on the base member. This particularly renders the device of the present invention adaptable to any type of objective question, such as multiple choice, true-false, etc. Answer indication is easily given by finger pressure on the answer indicia on the question and answer members.

Various modifications and alterations can be made within the scope of the invention, as claimed. For example, light 6 may be an LED (light emitting diode), LCD (liquid crystal display) or buzzer (for the visually handicapped). The contact areas 17, 33 and 52 in FIGS. 3, 10 and 12, respectively, may be any suitable size or shape and may be located in any position on the question and answer member.

I claim:

1. An electrical teaching apparatus comprising:
   a substantially rigid base member;
   a first electrically conductive layer at least partially covering a face of said base member;
   an electrically conducting contact member on said base member, said contact member being spaced from and always out of contact with said first electrically conductive layer;
   a source of power coupled between said contact member and said first electrically conductive layer;
   an indicator means coupled in series circuit with said power source, said first electrically conductive layer and said contact member; and
   a question and answer member adapted to overlie said first electrically conductive layer and to engage said contact member, said question and answer member including an electrically insulating bottom control layer which has at least one aperture therein; a second electrically conductive layer; an upper electrically insulating question layer having at least one question imprinted thereon and indicia for selecting an answer, said second electrically conductive layer being interposed between said control and question layers; at least said control layer and question layer being permanently coupled together in registration with each other and with said at least one aperture in registration with a correct answer indicia, said second conducting layer being located at least between said at least one aperture and its associated correct answer indicia; and said question layer covering all but a portion of said second electrically conductive layer, said contact member being engageable with said question and answer member for electrically contacting at least a part of said uncovered portion of said second electrically conductive layer;
   whereby when pressure is applied in the area of a correct answer indicia, an electrical circuit is completed to said indicator means from said power source, through said contact member and through said first and second electrically conductive layers which contact each other via said pressure in the vicinity of said at least one aperture in said control layer.

2. An electrical teaching apparatus according to claim 1 wherein said control layer and question layer are connected together at least along a portion of an edge thereof.

3. An electrical teaching apparatus according to claim 2, wherein said question and answer member comprises a folder, said control layer and question layer being foldably connected together along said at least a portion of one edge thereof to form said folder.

4. An electrical teaching apparatus according to any of claims 1, 2 or 3, wherein said second electrically conductive layer is secured on at least a portion of a surface of at least one of said control layer and said question layer.

5. An electrical teaching apparatus according to claim 4, wherein said second electrically conductive layer substantially covers said surface of said at least one of said control layer and said question layer on which it is secured.

6. An electrical teaching apparatus according to claim 4, wherein said second electrically conductive layer comprises a plurality of interconnected conducting areas which respectively are in registration with correct answer indicia and their associated apertures in said control layer.

7. An electrical teaching apparatus according to claim 4, wherein said question layer defines at least one opening therein to expose said second electrically conductive layer, said contact member being engageable with said question and answer member for electrically contacting at least a part of said exposed portion of said second electrically conductive layer.

8. An electrical teaching apparatus according to claim 4 further comprising an electrically conductive contact area on the opposite side of said control layer from that side which overlies said second electrically conductive layer, said contact area being electrically connected with said second electrically conductive layer.

9. An electrical teaching apparatus according to claim 1, wherein said layers of said question and answer member are fixed together.

10. An electrical teaching apparatus according to claim 9, wherein said layers of said question and answer member from a laminated structure.

11. An electrical teaching apparatus according to claim 1, wherein said electrically conducting contact member comprises a clip having two opposed conducting legs for engaging a question and answer member therebetween.

12. An electrical teaching apparatus according to claim 1, wherein said electrically conducting contact member comprises an electrically conducting area on said face of said base member which is electrically insulated from said first electrically conductive layer.

13. An electrical teaching apparatus according to claim 1 comprising an electrically insulating layer over a portion of said first electrically conductive layer, and said electrically conducting contact member comprises an electrically conductive area on said electrically insulating layer.

14. A question and answer member for use in an electrical teaching apparatus having a first electrically conducting layer partially covering a face of an electrically insulating base member, and an electrically conducting contact member on said base member, said question and answer member being adapted to overlie said first electrically conducting layer and to engage said contact member, said question and answer member comprising:
an electrically insulating bottom control layer which has at least one aperture therein;
a second electrically conductive layer;
an upper electrically insulating question layer having at least one question imprinted thereon and indicia for selecting an answer, said second electrically conductive layer being interposed between said control and question layers;
at least said control layer and question layer being permanently coupled together in registration with each other and with said at least one aperture in registration with a correct answer indicia, said second conducting layer being located at least between said at least one aperture and its associated correct answer indicia;
and said question layer covering all but a portion of said second electrically conductive layer, said contact member being engageable with said question and answer member for electrically contacting at least a part of said uncovered portion of said second electrically conductive layer;
whereby when said question and answer member is mounted on said teaching apparatus to overlie said first electrically conducting layer and pressure is applied to said question sheet in the area of a correct answer indicia, an electrical circuit is completed through said contact member and through said first and second electrically conducting layers which contact each other via said pressure in the vicinity of said at least one aperture in said control sheet.

15. A question and answer member according to claim 14, wherein said control layer and question layer are connected together at least along a portion of an edge thereof.

16. A question and answer member according to claim 15, wherein said control layer and question layer are foldably connected together along at least a portion of one edge thereof to form a folder.

17. A question and answer member according to any of claims 14, 15 or 16, wherein said second electrically conductive layer is secured on at least a portion of a surface of at least one of said control layer and said question layer.

18. A question and answer member according to claim 17, wherein said second electrically conductive layer substantially covers said surface of said at least one of said control layer and said question layer on which it is secured.

19. A question and answer member according to claim 17, wherein said second electrically conductive layer comprises a plurality of interconnected conducting areas which respectively are in registration with correct answer indicia and their associated apertures in said control layer.

20. A question and answer member according to claim 17, wherein said question layer defines at least one opening therein to expose said electrically conductive layer, said exposed portion being adapted to be contacted by said contact member of said teaching apparatus.

21. A question and answer member according to claim 17, further comprising an electrically conductive contact area on the opposite side of said conductive layer from that side which overlies said second electrically conductive layer, said contact area being electrically connected with said second electrically conductive layer.

22. A question and answer member according to claim 14, wherein said layers of said question and answer member are fixed together.

23. A question and answer member according to claim 22, wherein said layers of said question and answer member form a laminated structure.

* * * * *